United States Patent

Tsai et al.

[11] Patent Number: 5,936,239
[45] Date of Patent: Aug. 10, 1999

[54] LENS HOLDER FOR A SCANNER SYSTEM WITH ONE SUPPORTING POINT AND ONE PRESSING POINT

[75] Inventors: Jenn-Tsair Tsai, Taoyuan; Jey-Chung Yang, Chung Ho, both of Taiwan

[73] Assignee: Mustek Systems Inc., Hsinchu, Taiwan

[21] Appl. No.: 08/968,559

[22] Filed: Nov. 12, 1997

[30] Foreign Application Priority Data

Nov. 13, 1996 [TW] Taiwan ................................. 85217382

[51] Int. Cl.[6] ...................................................... H01J 5/02
[52] U.S. Cl. ........................... 250/239; 250/216; 359/819
[58] Field of Search .................................... 250/239, 216, 250/208.1; 396/83, 76; 359/819, 822, 811, 813, 815

[56] References Cited

U.S. PATENT DOCUMENTS 5,864,437  1/1999  Takemoto ................................. 250/216

Primary Examiner—Que T. Le
Attorney, Agent, or Firm—McDermott, Will & Emery

[57] ABSTRACT

The present invention includes a lens holder base, a first covering element and a second covering element. A V shape trench is formed on the top surface of the lens holder base for holding the lens. Further, the trench is preferably formed to be orthogonal to the CCD. The first covering element and the second covering element are utilized for preventing the noise light from interfereing the CCD. The second covering element is a flat plane having a protrudent portion, which is connected to the first covering element. The flat plane portion of the second covering element has screws that are used to connect to the top surface of the lens holder base. An adjusting element is set on the top of the protrudent portion for adjusting the focal length of the lens set.

13 Claims, 5 Drawing Sheets

1

LENS HOLDER FOR A SCANNER SYSTEM WITH ONE SUPPORTING POINT AND ONE PRESSING POINT

FIELD OF THE INVENTION

The present invention relates to a scanner, and more specifically, to a lens holder for a scanner system.

BACKGROUND OF THE INVENTION

A scanner system makes use of focusing a reflecting light beam through a photodetector to generate an image signal for further image prosessing. A conventional scanner system includes a light source, a mirror, and a lens set, which are used to guide the reflecting light to a charge couple device (CCD). The charge couple device is utilized to generate an image signal. A pre-processing element is used to respond an image signal and adjust dc gain of the image signal. An analogue to digital converter is used to convert adjusted image signal to a digital signal and a post-processing element to generat an image code by processing said digital signal through highlight, shadow, and Gamma correction.

Typically, the light source is reflected from the surface of a document, then it is reflected against from the mirror and focused by a lens set. The mirror and the lens set are used to guide the light beam to a CCD. Subsequently, the light beam is converted to an image signal by the CCD, and direct current (d.c.) gain of the image signal is adjusted by a pre-processing element, i.e. a d.c. gain voltage amplifier. Then the adjusted image is fed to an analogue to digital converter (ADC) for converting adjusted image signal to a digital signal. The digital signal is fed to a post-processing element to generat an image code by processing the digital signal through highlight, shadow, and Gamma correction.

Generally speaking, the carriage of a scanner is made of aluminum or plastic. Turning to FIG. 1A, it shows a conventional lens holder 10 for holding a lens set 104 and adjusting the focus of the lens 104. A trapezoid shape housing 101 is set on a bottom plate 102. A cylindrical lens fixing element 103 for holding the lens set 104 is conneted to the housing 101. An elastic slice 105 is attached on the outer portion of the lens fixing element 103 to fix the lens set 104 in the lens fixing element 103. In order to focalize the light on the CCD, the lens set 104 can be moved along the axis of the lens fixing element 103.

As shown in FIG. 1B, 1C, the internal radius of the lens fixing element 103 is longer than the external radius of the lens set 104. Therefore, the axis of the lens set 104 can not be aligned with the axis of the cylindrical lens fixing element 103. That is to say the axis of the lens set 104 is not orthogonal to the CCD. Further, the lens set 104 is often shift due to an external force from the elastic slice 105 acts on one end of the lens set 104. Referring to FIG. 1C, another type of the lens holder 10 has a set screw 106 set on the lens fixing element 103 for fixing the lens set 104. It is also the reason to cause the shift of the axis of the lens set 104.

FIG. 2A shows the conditions that the axis of the lens set 104 is not orthogonal to the CCD. FIG. 2B to FIG. 2E show the testing wave shape of a scanner that are analyzed by using an oscilloscope. FIG. 2B is the diagram corresponding to the axis of the lens set 104 that is orthogonal to the CCD. FIG. 2C to FIG. 2E are the diagrams corresponding to the axis of the lens set 104 that are not orthogonal to the CCD. It can be seen in the FIG. 2C to FIG. 2E, the light can not be focalized on the CCD due to the axis of the lens set 104 is shift.

SUMMARY OF THE INVENTION

The present invention includes a lens holder base, a first covering element and a second covering element. A V shape trench is formed on the top surface of the lens holder base for holding the lens. In a cross section view, the lens set contacts with the trench via two contact points. Further, the trench is preferably formed to be orthogonal to the CCD. The first covering element and the second covering element are utilized for preventing the noise light from interfereing the CCD. Preferably, the first covering element is a trapezoid shape housing. The second covering element is a flat plane having a protrudent portion, which is connected to the first covering element. In the cross section view, the second covering element contacts with the lens set via a contact point. The flat plane portion of the second covering element has screws that are used to connect to the top surface of the lens holder base. An adjusting element is set on the top of the protrudent portion for adjusting the focal length of the lens set.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 3A:
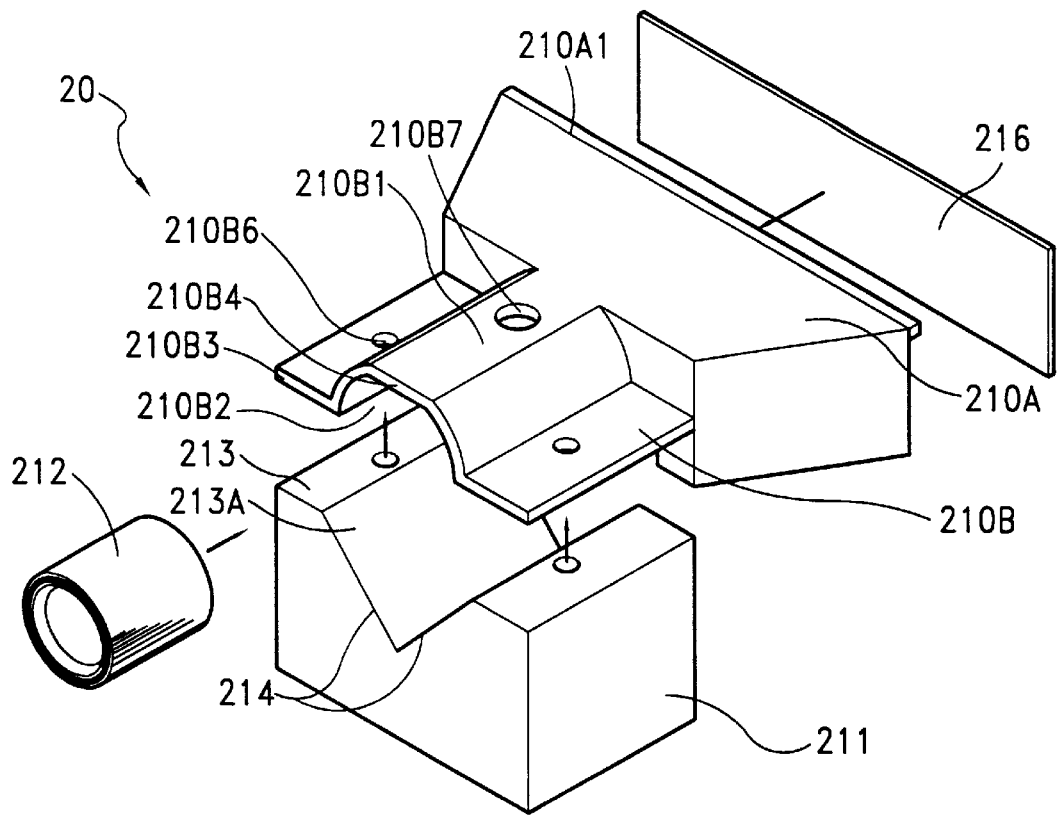
FIG. 3A to FIG. 3D are lens set holders of the present invention.
Figure 3B:
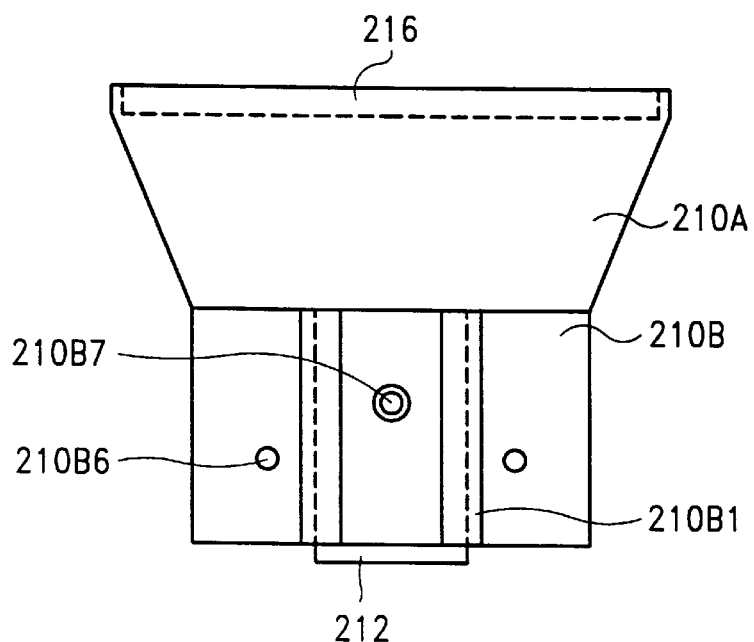
Figure 3C:
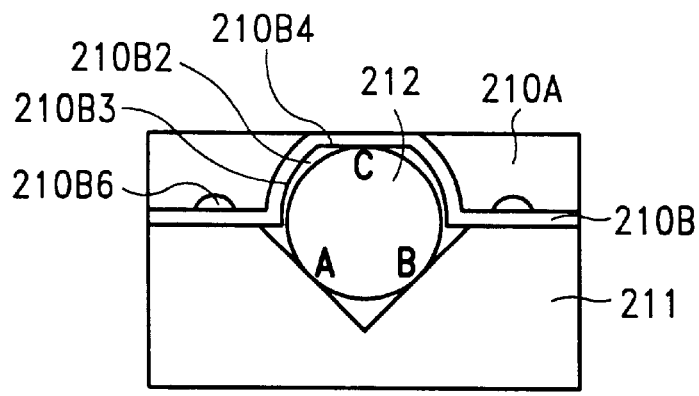
Figure 3D:
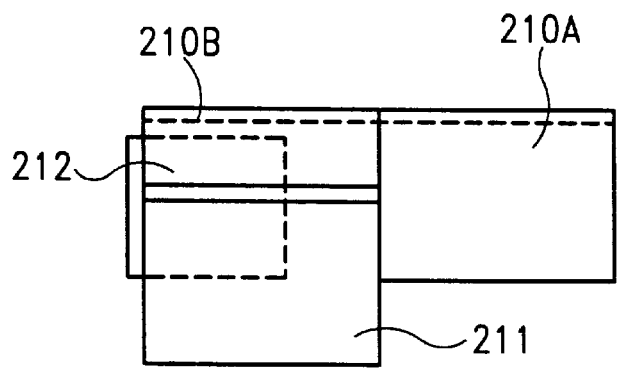

FIG. 3A, 3B, 3C and 3D show the preferred embodiment of the present invention. The lens holder 20 includes a lens holder base 211, a covering element cosisting of a first covering element 210A and a second covering element 210B. A trench 213A is formed on the top surface 213 of the lens holder base 211 for holding the lens 212. The trench 213A includes at least two inclined plane 214. In the preferred embodiment, the trench 213A is formed of "V" shape (as shown in FIG. 3C). As shown in FIG. 3C, in the cross section view, when the lens set 212 is set on the trench 213A, the lens set 212 only contacts with each inclined plane 214 via one contact point, respectively (i.e. contact point A, contact point B). Further, the trench 213A is preferably formed to be orthogonal to the CCD 216. Therefore, the lens set 212 only can be moved along the trench 213A. That is to say the lens is always orthogonal to the CCD 216.

Turning to FIG. 3A, 3B, 3C and 3D, the covering element is used to hold the lens and to adjust the focal length of the lens 212. Further, the first covering element 210A and the second covering element 210B are utilized for preventing the noise light from interfereing the CCD 216. Preferably, the first covering element 210A is a trapezoid shape housing. The CCD 216 is set on the side 210A1 of the first covering element 210A. In other words, the CCD 216 is set on the longer side of the trapezoid shape housing 210A. The second covering element 210B is a flat plane having a protrudent portion 210B1, which is connected to the side 210A2 of the first covering element 210A. That is to say that the second covering element 210B is connected to the shorter side of the trapezoid shape housing 210A. The second covering element 210B has the same width with the side 210A2 of the first covering element 210A. As shown in FIG. 3C, in the preferred embodiment, the protrudent portion 210B1 forms a cavity 210B2 to hold the lens set 212. The protrudent portion 210B1 consists of two inclined plane 210B3 and one horizontal plane 210B4. Still referring to FIG. 3C, in the cross section view, the second covering element 210B contacts with the lens set 212 via a contact point C while the second covering element 210B is set on the lens set 212. In the preferred embodiment, the second covering element 210B contacts with the lens set 212 only via the contact point C. Further, the inclined planes 210B3 will not contact with the lens set 212. The flat plane portion of the second covering element 210B has screws 210B6 that is used to connect to the top surface 213 of the lens holder base 211. Preferrably, an adjusting element 210B7 is set on the top of the protrudent portion 210B1 for adjusting the focal length of the lens set 212. In the preferred embodiment, the adjusting element 210B7 is a hole through the second covering element 210B to the lens set 212. When an engineer wants to adjust the focal length, first, the screws 210B6 will be loose from the second covering element 210B, then a stick is used to move the lens set 212 back and forth to a suitable position. The lens 212 can be only moved along the trench 2123A of the lens holder base 211. Further, in the cross section view, the lens 212 contact the lens holder via three contact points. Therefore, the lens 212 will not be shifted when an engineer adjusts the local length of the lens 212.

Figure 3E:
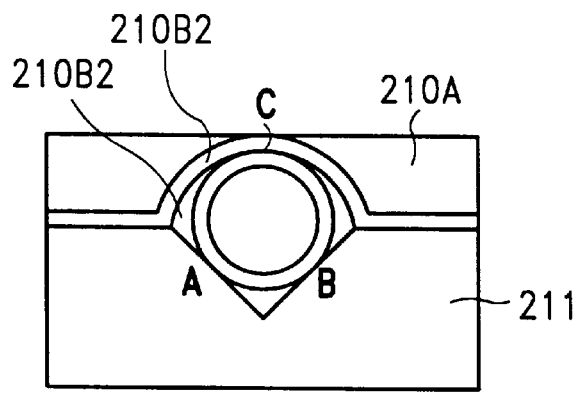
FIG. 3E is another embodiment of lens set holders of present invention.

Turning to FIG. 3E, alternatively, the protrudent portion 210B1 of the second covering element 210B can be a portion of a cylinder. The curvature of the cylinder is smaller than the one of the lens set 212 so that the protrudent portion 210B1 contacts with the lens set 212 only via one contact point.

Figure 1A:
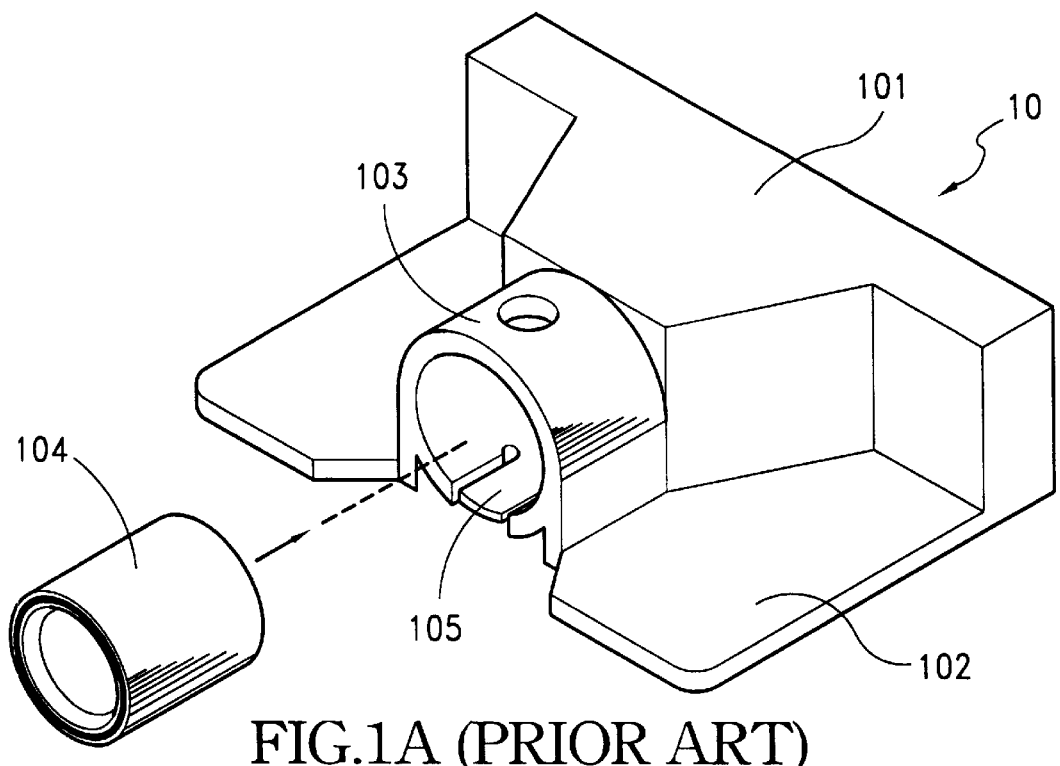
FIG. 1A to FIG. 1C are conventional lens set holders.
Figure 1B:
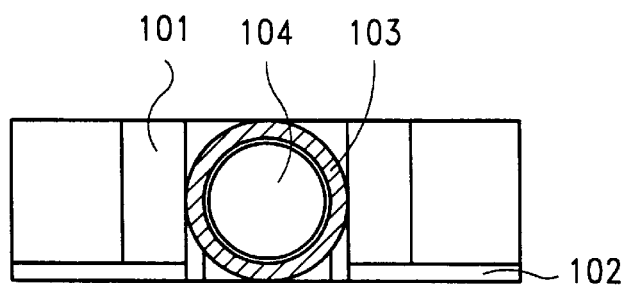
Figure 1C:
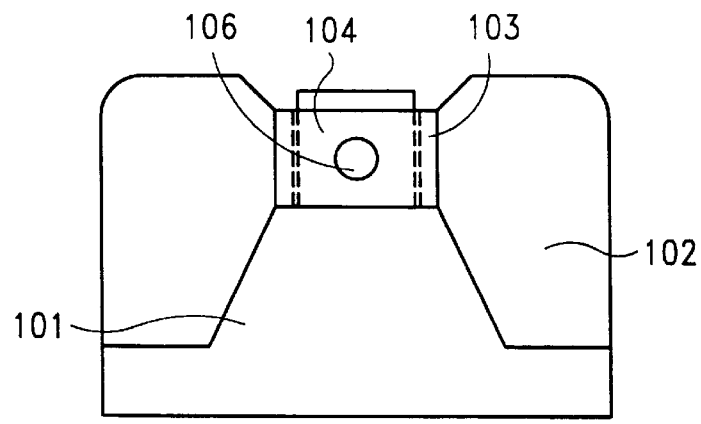
Figure 2A:
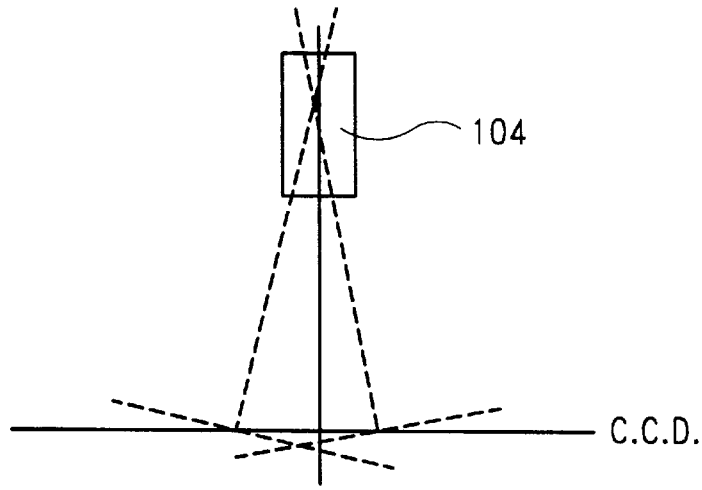
FIG. 2A is the condition that the axis of the lens set is not orthogonal to the CCD.
Figure 2B:
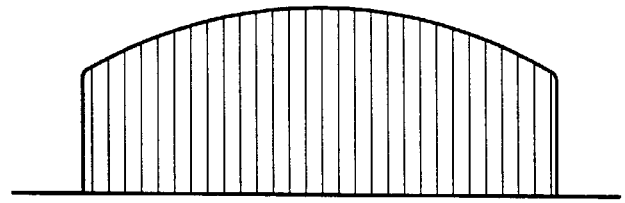
FIG. 2B to FIG. 2E are the testing wave shapes of a scanner in accordance with the prior art.
Figure 2C:
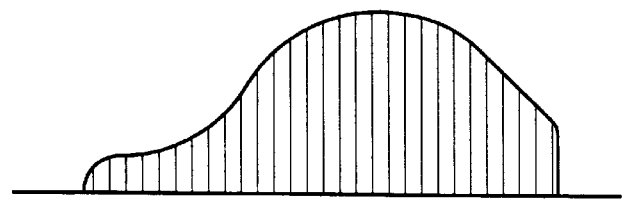
Figure 2D:
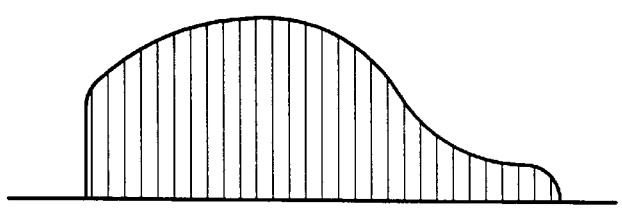
Figure 2E:
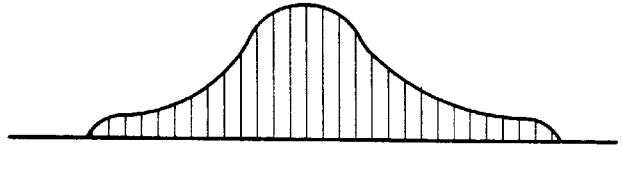
Figure 4A:
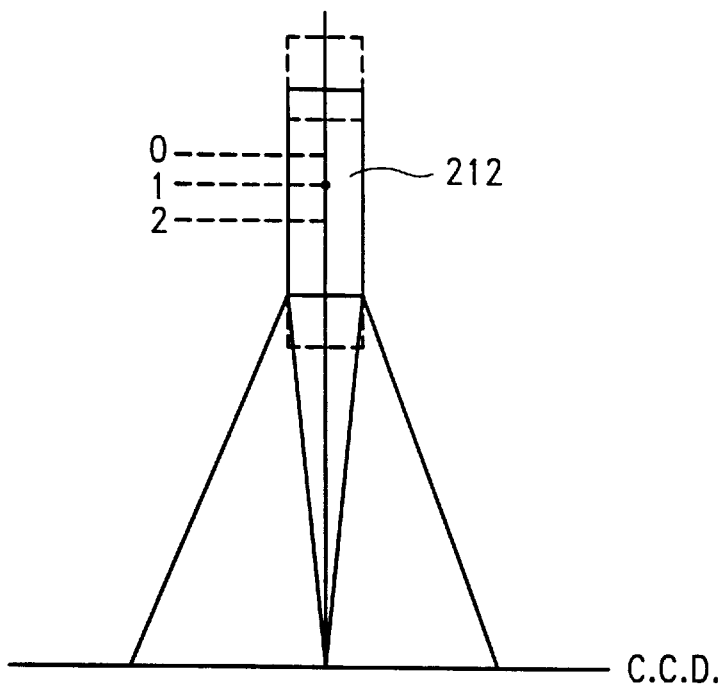
FIG. 4A to FIG. 4D are the testing wave shapes of a scanner in accordance with the present invention.
Figure 4B:
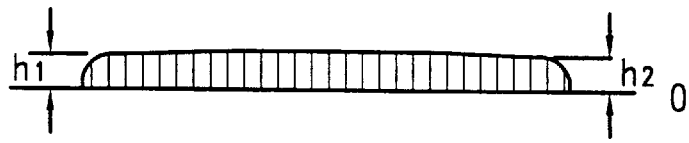
Figure 4C:
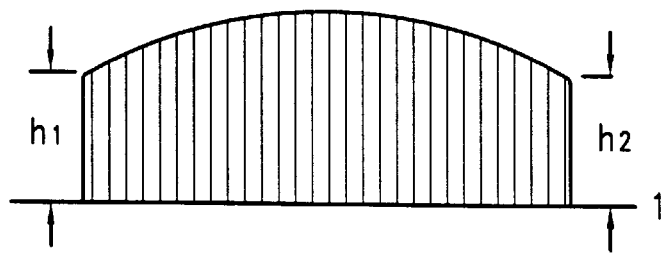
Figure 4D:
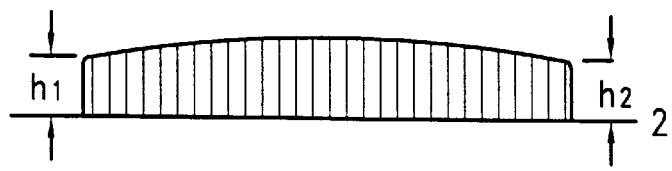

FIG. 4A shows the condition that the axis of the lens 212 is orthogonal to the CCD due to the lens 212 can only be moved along the trench 213A of the lens holder base 211. FIG. 4B to FIG. 4D show the testing wave shape of a scanner that are analyzed by using an oscilloscope. Each of the drawings is corespounding to the positions where the lens 212 is set on the lens holder base 211, respectively. When the axis of the lens 212 is orthogonal to the CCD, the testing wave shape is shown as the FIG. 2B. Therefore, it can be seen in the FIG. 4B to FIG. 4D, every drawings shows that the lens 212 is orthogonal to the CCD no matter where the lens 212 is. FIG. 4C represents that the light can be focus on the CCD due to the CCD is located on the focal length. In the drawings, the signal intensity in FIG. 4C is higher than the ones in FIG. 4B, FIG. 4D.

As is understood by a person skilled in the art, the foregoing preferred embodiment of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. An apparatus for holding and adjusting lens set of an optic scanner, said apparatus comprising:

a lens holding base having a trench for holding said lens set, wherein said trench has at least two first planes that respectively contact said lens set at only one supporting point in the cross section of said lens, said trench is formed to be orthogonal to a CCD, and said lens set can only be moved along said trench of said holding base;

covering means set on said lens holding base and having a protrudent portion for holding said lens set, wherein said protrudent portion comprises at least a second plane contacting said lens set at only one pressing point in the cross section, and by way of contacting at the supporting points and pressing point, said covering means and said lens holding base can jointly fix said lens set in said trench; and fixing means for fixing said covering means on said lens holding base.

2. The apparatus of claim 1, wherein said fixing means is a screw.

3. The apparatus of claim 1, wherein said trench is a V shape trench.

4. The apparatus of claim 1, wherein said covering means having a trapezoid shape housing.

5. The apparatus of claim 1, wherein said protrudent portion further comprises second two inclined planes which will not contact with said lens set.

6. The apparatus of claim 1, wherein said protrudent portion further comprises adjusting means for adjusting the focal length of said lens set.

7. The apparatus of claim 1, wherein said covering means has a hole formed on said protrudent portion to serve as said adjusting means.

8. An apparatus for holding and adjusting lens set of an optic scanner, said apparatus comprising:

a lens holding base having a trench for holding said lens set, wherein said trench having at least two first inclined plane that respectively contact said lens set at only one point and said trench being formed to be orthogonal to a CCD, wherein said lens set can only being moved along said trench of said holding base;

covering means set on said lens holding base for fixing said lens set by contacting said lens set at only one point, adjusting the focal length of said lens set and preventing intrusive light from interfering said CCD, wherein said covering mean having a protrudent portion for holding said lens set, wherein said protrudent portion comprising a cavity for holding said lens set and being a portion of a cylinder; and a plurality of fixing means attached on said covering means for fixing said lens holding base.

9. The apparatus of claim 8, wherein the curvature of said cylinder is smaller than the curvature of said lens set.

10. The apparatus of claim 8, wherein said fixing means is a screw.

11. The apparatus of claim 8, wherein said trench is a V shape trench.

12. The apparatus of claim 8, wherein said protrudent portion further comprises adjusting means for adjusting the focal length of said lens set.

13. The apparatus of claim 8, wherein said covering means has a hole formed on said protrudent portion to serve as said adjusting means.

* * * * *